(12) United States Patent
Spahn et al.

(10) Patent No.: US 9,926,018 B2
(45) Date of Patent: Mar. 27, 2018

(54) VEHICLE CARGO AREA EXTENDER WORK SURFACE

(71) Applicant: FORD GLOBAL TECHNOLOGIES, LLC, Dearborn, MI (US)

(72) Inventors: Brian Robert Spahn, Plymouth, MI (US); Pattrick Loew, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 12 days.

(21) Appl. No.: 15/210,534

(22) Filed: Jul. 14, 2016

(65) Prior Publication Data

US 2018/0015962 A1    Jan. 18, 2018

(51) Int. Cl.
*B60N 99/00*    (2006.01)
*B62D 33/027*    (2006.01)

(52) U.S. Cl.
CPC ................................. *B62D 33/0273* (2013.01)

(58) Field of Classification Search
CPC .................................................. B62D 33/0273
See application file for complete search history.

(56) References Cited

U.S. PATENT DOCUMENTS

| | | |
|---|---|---|
| 2,160,958 A | 6/1939 | Critchlow |
| 2,228,203 A | 1/1941 | De Hoffman et al. |
| 5,028,063 A | 7/1991 | Andrews |
| 5,975,608 A | 11/1999 | Jarman |
| 6,082,801 A | 7/2000 | Owen et al. |
| 6,179,360 B1 | 1/2001 | Davian |
| 6,224,127 B1 | 5/2001 | Hodge |
| 6,454,338 B1 | 9/2002 | Glickman et al. |
| 6,629,807 B2 | 10/2003 | Bernardo |
| 6,712,568 B2 | 3/2004 | Snyder et al. |
| 6,722,290 B2 | 4/2004 | Wetterlund |
| 7,021,689 B1 | 4/2006 | Weisbeck, III |
| 7,628,439 B1 | 12/2009 | Strong |
| 7,712,811 B2 | 5/2010 | Heaman et al. |
| 8,029,038 B2 | 10/2011 | Woodhouse et al. |
| 2010/0001029 A1 | 1/2010 | Tai |

*Primary Examiner* — Lori L Lyjak
(74) *Attorney, Agent, or Firm* — Jason Rogers; King & Schickli PLLC

(57) ABSTRACT

A work surface apparatus for a vehicle cargo area includes a tailgate including at least two panel-supporting posts adapted for translating between a stowed position and a substantially horizontal deployed position to hold a work surface and a cargo area extender configurable for supporting in a substantially planar configuration by the deployed at least two panel-supporting posts. The cargo area extender may be defined by a folding panel. The folding panel may be defined by hingedly connected sections and may be stowed within a portion of the tailgate.

19 Claims, 7 Drawing Sheets

VEHICLE CARGO AREA EXTENDER WORK SURFACE

TECHNICAL FIELD

This document relates generally to the motor vehicle field and, more particularly, to a vehicle cargo area extender configurable as a work surface.

BACKGROUND

For various reasons, it may be desirable to extend the effective length of a vehicle cargo area such as a truck bed, such as for hauling a particularly long piece of cargo that would not fit in the cargo area with the tailgate in the raised position. In some cases, this is done by lowering the tailgate and placing a cargo area extender thereon to effectively increase the usable cargo area volume. Such cargo area extenders may be cage-like structures comprised of stacked, curved bars, box-like structures comprised of adjoining panels, and others. While effective, this arrangement requires using a large, separate component for placement on the lowered tailgate, which must be stored apart from the vehicle when not in use. Alternatively, the cargo area extender may be carried in the vehicle cargo area, but this reduces the amount of usable space in the vehicle cargo area.

In turn, often vehicle users require work surfaces for performing various tasks, and it is highly convenient to the user to have such work surfaces associated with or carried in the truck cargo area for use. However, again storing work surfaces such as tables, sawhorses, etc. in a truck cargo area reduces the amount of space usable for carrying other items.

Thus, a need is identified for a vehicle cargo area work surface that can be easily stowed when not in use so as not to occupy otherwise usable cargo area storage space, but which can be rapidly and easily deployed from the stowed configuration for use.

SUMMARY

In accordance with the purposes and benefits described herein, a work surface apparatus for a vehicle cargo area is provided, comprising a tailgate including at least two panel-supporting posts adapted for translating between a stowed position and a substantially horizontal deployed position to hold a work surface. The apparatus further includes a cargo area extender configurable for supporting in a substantially planar configuration by the deployed at least two panel-supporting posts.

In embodiments, the cargo area extender is defined by a folding panel. The folding panel may be stowed within a portion of the tailgate. In embodiments, the at least two panel-supporting posts are hingedly connected to the tailgate. In other embodiments, the at least two panel-supporting posts are extendable outwardly from the tailgate when placed in a lowered configuration to provide the substantially horizontal deployed orientation.

In embodiments, the folding panel comprises a plurality of hingedly connected sections. Lockable hinges may be included to hold the plurality of hingedly connected sections in a folded and/or an unfolded configuration. In other embodiments, the folding panel comprises a plurality of pins and/or tongues for inserting into cooperating apertures and/or slots defined in the at least two panel-supporting posts.

In another aspect, a work surface apparatus for a vehicle cargo area is provided, comprising a tailgate including at least two support posts adapted for translating between a stowed position and a substantially horizontal deployed position and a folding cargo area extender configurable to define a substantially planar work surface for holding in a substantially horizontal orientation by the deployed at least two support posts. In embodiments, the at least two support posts are hingedly connected to the tailgate and/or deploy by extending outwardly from the tailgate when placed in a lowered configuration.

In yet another aspect, a vehicle including a cargo area work surface apparatus is provided, comprising a tailgate or liftgate including at least two support posts adapted for translating between a stowed position and a substantially horizontal deployed position and a folding cargo area extender held in a recessed stowed position within a portion of the tailgate and adapted to be unfolded into a substantially planar configuration supported by the deployed at least two support posts.

In the following description, there are shown and described several preferred embodiments of the vehicle cargo area work surface. As it should be realized, the arrangement is capable of other, different embodiments and its several details are capable of modification in various, obvious aspects all without departing from the cargo area work surface as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle cargo area work surface and together with the description serve to explain certain principles thereof. In the drawing figures.

Reference will now be made in detail to the present preferred embodiments of the vehicle cargo area work surface, examples of which are illustrated in the accompanying drawing figures.

DETAILED DESCRIPTION

Figure 1:
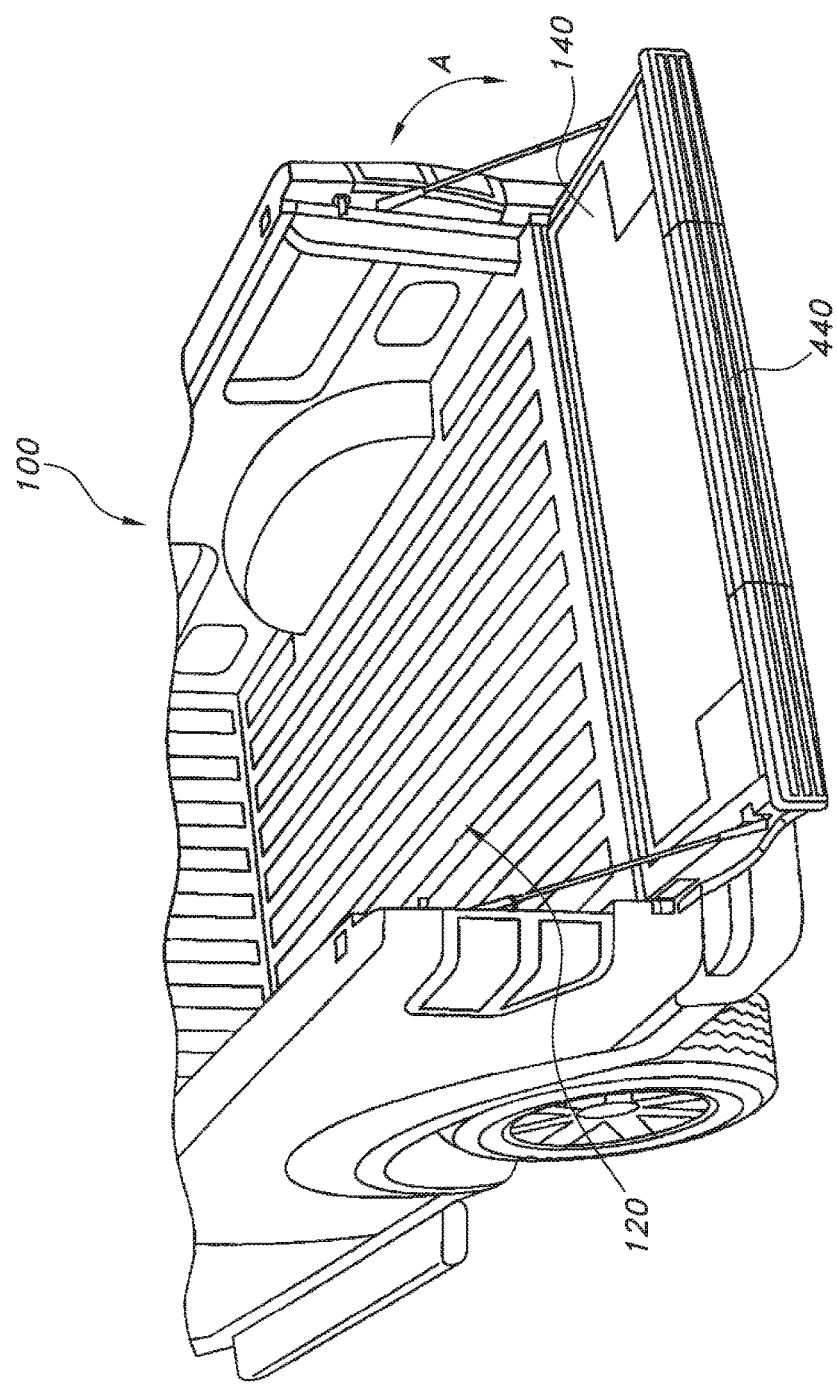
FIG. 1 is a rear view of a vehicle including a hingedly connected tailgate or liftgate.

Reference is now made to FIG. 1, which illustrates a vehicle 100 including a cargo area or bed 120 and a hingedly attached tailgate 140 configured for translating (see arrow A) between a raised, generally vertical closed position and the lowered, generally horizontal open position shown in the drawing. While the illustrated vehicle 100 is a pickup truck, it will be appreciated that other vehicle types include such a tailgate or liftgate, for example sport-utility vehicles, station wagons, and others, and so the vehicle type and closure panel will not be construed as limiting. The tailgate 140 and cargo area 120 may include a variety of hinged, support, and latching devices which are well known in the art and which do not require extensive discussion herein.

Figure 2A:
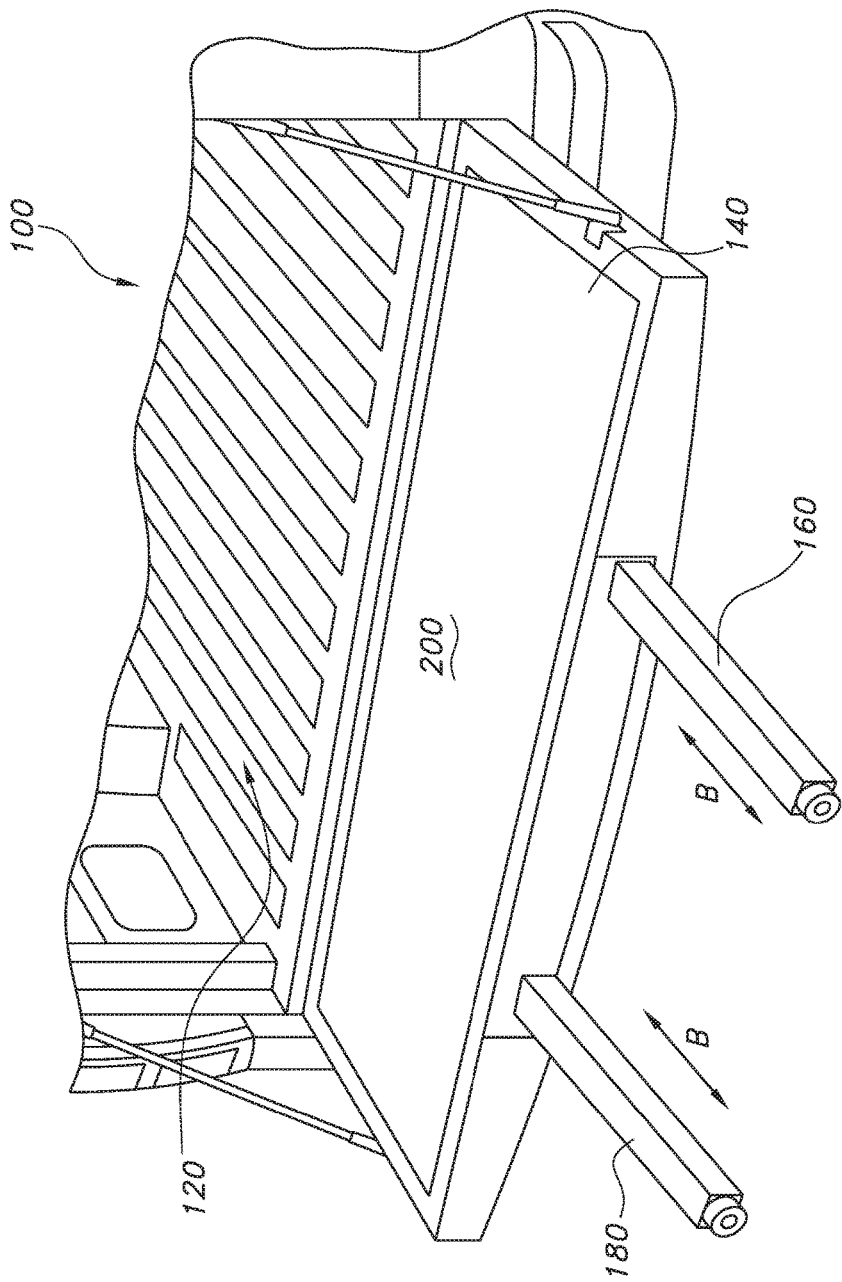
FIG. 2A shows a pair of posts deployed from the lowered tailgate of FIG. 1.
Figure 2B:
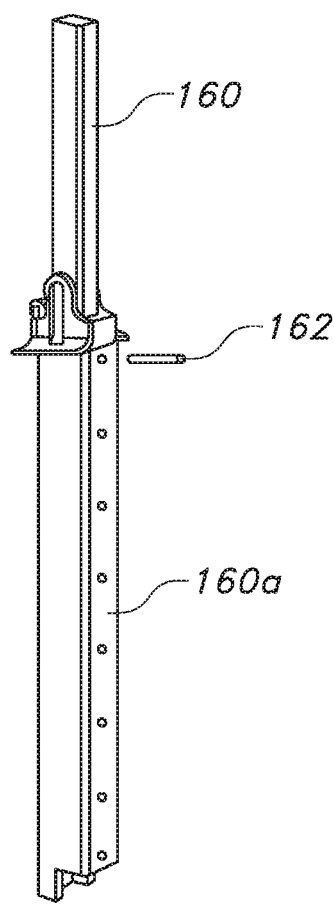
FIG. 2B shows a retracting post mechanism in accordance with the present disclosure.

The tailgate 140 is provided with posts which may be translated between a stowed position and one or more deployed positions. In the embodiment depicted in FIG. 2A, the tailgate 140 is provided with a pair of posts 160, 180 configured for deploying to extend from the lowered tailgate in a generally horizontal orientation, and for retracting back into the stowed position (see arrows B). Of course, additional posts may be added in accordance with the dimensions and/or weight which the posts are required to support. In one possible embodiment (see FIG. 2B), each post 160, 180 (only post 160 is shown for clarity) may include an extendable portion 160a, 180a that telescopes into another member, such as a tubular receiver 160b, 180b, associated with and fixed to the tailgate 140 (not shown in this view). A suitable locking pin 162 may also be provided for locking the posts 160, 180 in the deployed and stowed positions.

In an alternative embodiment, the posts 160, 180 may be configured to be raised into a generally vertical position, and then to be lowered into the generally horizontal position, substantially along a same plane as the lowered tailgate. This may be accomplished by brackets including pivots (embodiment not shown) for securing the posts 160, 180 to the tailgate. One suitable embodiment of such posts is disclosed in detail in U.S. Pat. No. 9,302,719 to Ford Global Technologies, Ltd, the disclosure of which is incorporated herein by reference in its entirety.

Alternatively, the posts 160, 180 may be configured to be stowed in one or more receivers (embodiment not shown) molded or otherwise formed in an inner panel 200 of the tailgate 140, and to be raised to the generally vertical orientation and then to be lowered to the generally horizontal orientation. An exemplary configuration of posts configured to be so stowed/deployed is shown in U.S. Pat. No. 7,090,276, the disclosure of which is incorporated herein by reference in its entirety. The raising/lowering of the posts 160, 180 may be accomplished by use of brackets including pivots. An example of such brackets is disclosed in U.S. Pat. No. 9,302,719. Any number of retainer mechanisms may be used to secure the posts 160, 180 in the desired orientation, including without intending any limitation pins, clips, dogs, and other retainers.

The posts 160, 180 may be held in the suitably configured and dimensioned receivers by a number of mechanisms. The receivers may be dimensioned to hold the posts 160, 180 by a friction or interference fit. Alternatively or in addition, various clips (not shown) may be provided to hold or assist in holding the various components in the receivers. Still further, the posts 160, 180 may be configured for removal from the tailgate 140 and insertion into dedicated brackets or sleeves provided in the tailgate body and/or the tailgate inner panel 200 to respectively hold the posts in one or both of the described generally vertical and generally horizontal orientations, with pins, clips, etc. provided to secure the posts in the brackets or sleeves. All such mechanisms are contemplated for use herein.

Figure 3:
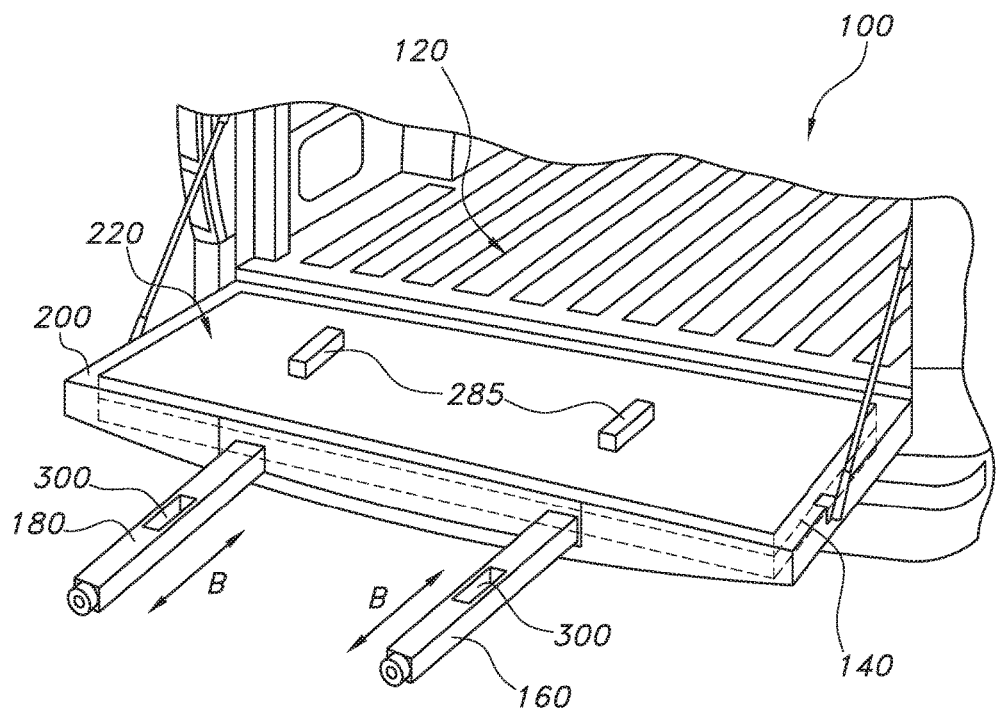
FIG. 3 shows an embodiment of a cargo area extender according to the present disclosure, stowed in a vehicle tailgate or liftgate.
Figure 4:
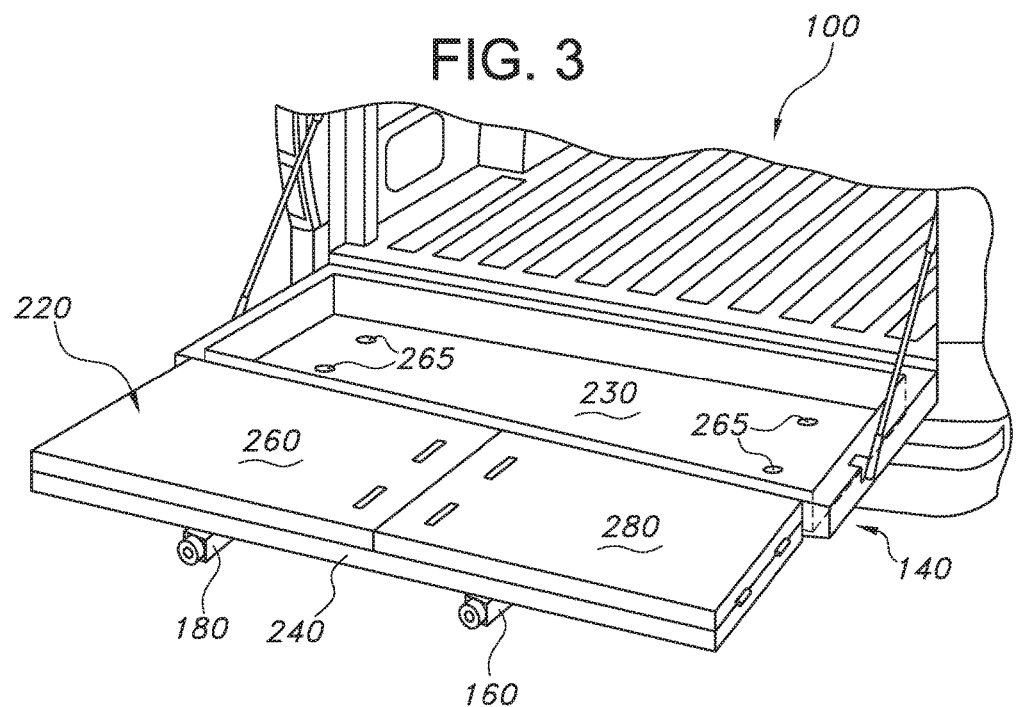
FIG. 4 shows the cargo area extender of FIG. 3 placed on retracting posts associated with the vehicle tailgate or liftgate.

Continuing, with reference to FIG. 3 a cargo area extender 220 is provided, which may be provided in a number of suitable configurations. The cargo area extender 220 may be defined by a unitary panel (see FIG. 8), by a plurality of interlocking panels (see FIG. 7), or by a folding panel (see FIGS. 4-6A, 6B). The cargo area extender 220 may be attached to an inner surface of the tailgate 140 (see FIGS. 3 and 6A) or may be stowed in a cavity defined in the tailgate (see FIGS. 4-5 and 8). Alternatively, the cargo area extender need not be stowed in or on the tailgate 140 (embodiment not shown).

In more detail, as shown in FIG. 3 a folding cargo area extender 220 is provided. The cargo area extender 220 may be attached to the inner panel 200 of the tailgate 140 (see FIG. 3), or may be received in a cavity 230 defined in the body of the tailgate (see FIGS. 4-5). The cavity 230 may be dimensioned to hold the folded cargo area extender 220 by a friction or interference fit. Alternatively or in addition, various bolts 265 or clips (not shown) may be provided to hold or assist in holding the various components in the receivers. All such mechanisms are contemplated for use herein. The cargo area extender 220 may be entirely removable from the tailgate cavity 230 (see FIG. 5) or may be hingedly attached to a portion of the tailgate 140 to allow pivoting upwardly and outwardly for deployment (see FIG. 4). The unfolded cargo area extender 220 may be secured to the deployed posts 160, 180 such as by cooperating tongues or pins 285 received in cooperating slots or apertures 300 (see FIG. 3). Of course, alternative fastening mechanisms are contemplated, including fasteners such as bolts or screws, pin/clip arrangements, and others.

Figure 5:
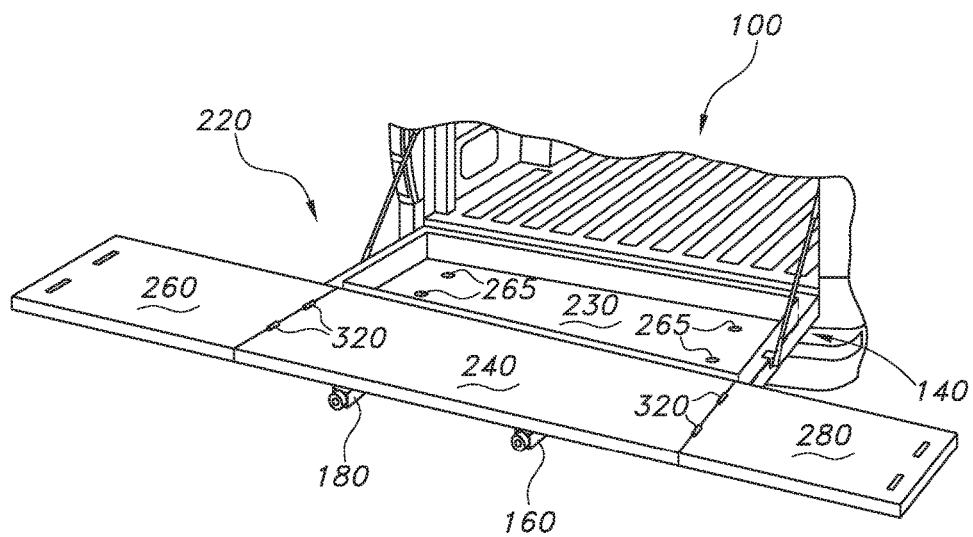
FIG. 5 shows the cargo area extender of FIG. 4 configured for use as a work surface.
Figure 6A:
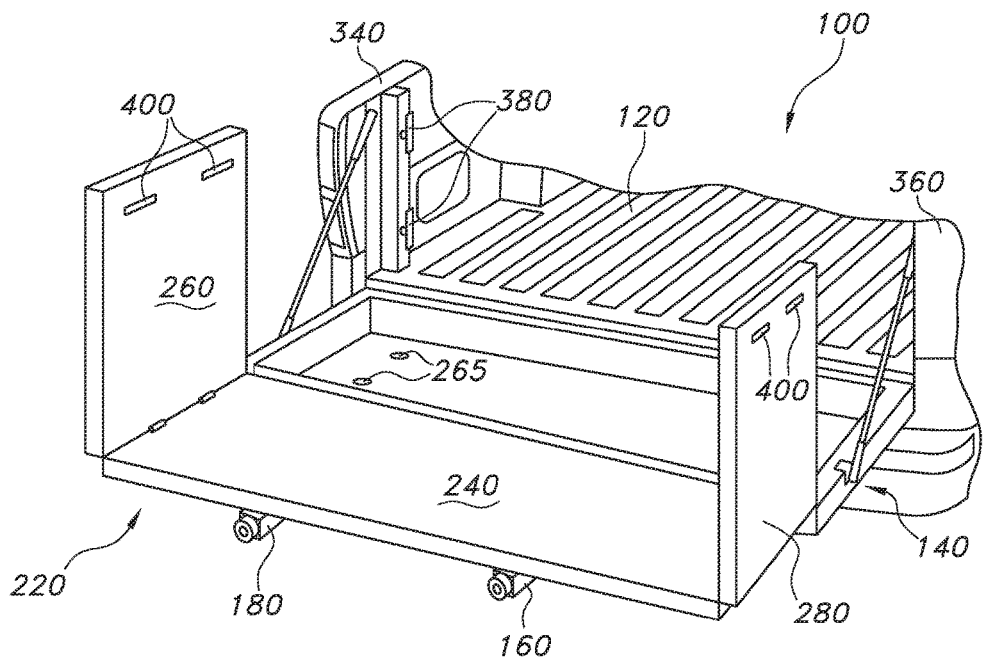
FIG. 6A shows the cargo area extender of FIG. 3 with partially raised side panels.

In use as a work surface, as shown in FIGS. 5-6 the cargo area extender 220 may be removed from its stowed position, unfolded and locked to form a substantially flat panel, and placed in a substantially transverse and horizontal orientation across the posts 160, 180, thereby providing a convenient work surface. In an embodiment hinges 320 are provided that are 180 degree hinges which provide only a sufficient range of motion (arrows C) to open the folding cargo area extender out to define a flat panel as shown in FIG. 7. The hinges 320 may be lockable to retain the folding cargo area extender 220 respectively in the folded and unfolded configurations. Such hinge mechanisms are well known in the art and do not require substantial discussion herein.

Figure 6B:
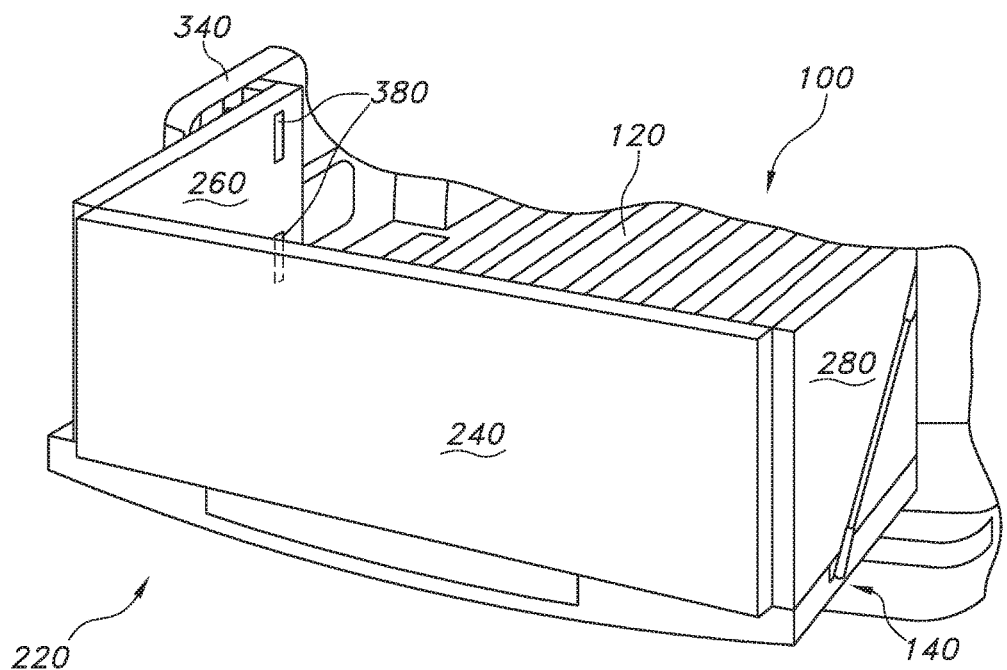
FIG. 6B shows the cargo area extender of FIG. 3 in use as a cargo area extender.
Figure 7:
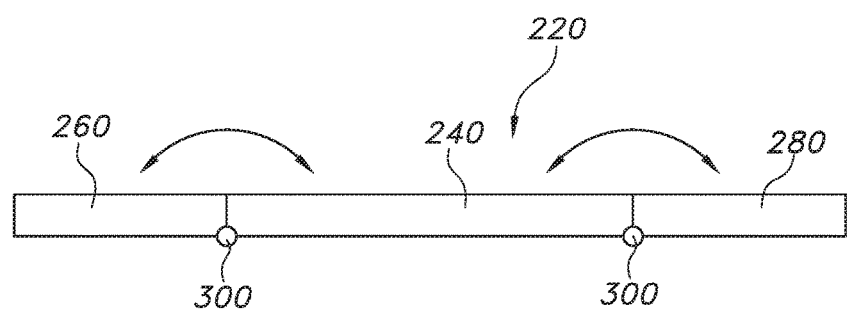
FIG. 7 shows a side view of a cargo area extender according to the present disclosure, configured for use as a work surface.

In use as a cargo area extender, the side panels 260, 280 may connect to the inner walls of cargo area sides 340, 360 as shown in FIG. 6B. For this function, the cargo area extender 220 is deployed by raising the central panel 240 to a substantially vertical orientation (see FIG. 6B) and then side panels 260, 280 are rotated out. Fasteners 380, in the depicted embodiment being rotating catches, engage cooperating slots 400 disposed in side panels 260, 280 to form a cargo area extender substantially around an exterior diameter of the tailgate inner panel 200. Of course, alternative fasteners for securing side panels 260, 280 to the inner cargo area sides 340, 360 are contemplated.

Figure 8:
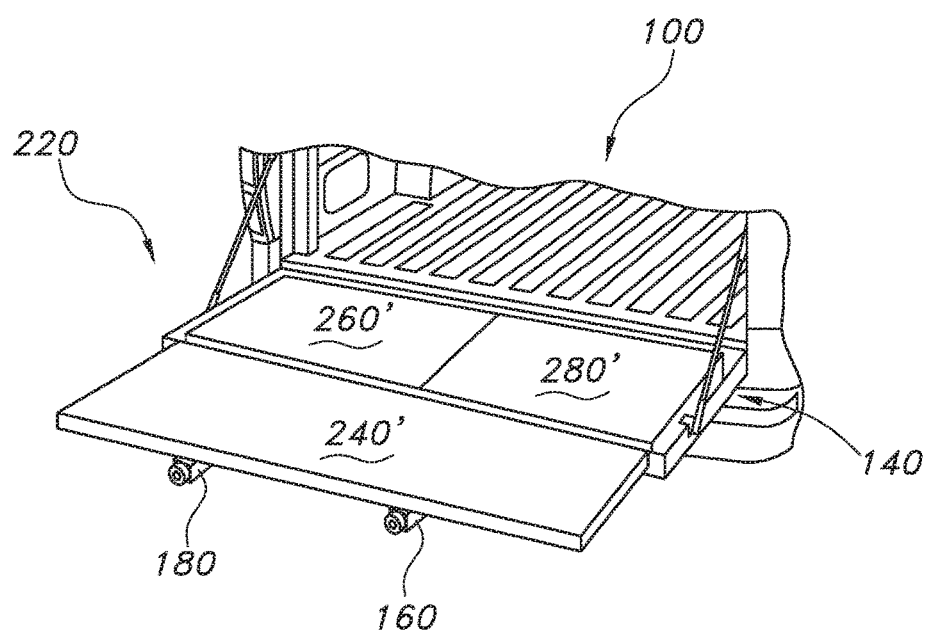
FIG. 8 shows an alternative embodiment of a cargo area extender according to the present disclosure.

Still additional alternative embodiments are contemplated. For example, as shown in FIG. 8, cargo area extender 220 may be defined by separable side panels 260', 280' which are removed from tailgate 140 and attached to a central panel 240'. In yet another embodiment (not shown), a single, unitary panel may be provided, attached to the tailgate 140 and/or received in the cavity 240 as described above, which is removed from or hingedly pivots out from the tailgate and is placed on or attached to posts 160, 180 to serve as a work surface and/or a side-less cargo area extender. Additional features may be included, such as a retractable tailgate-mounted step assembly 440 (see FIG. 1). A number of suitable step assemblies are known in the art, such as those described in U.S. Pat. Nos. 6,918,624, 7,090,276, and 7,234,749, the disclosures of which are incorporated herein by reference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A work surface apparatus for a vehicle cargo area, comprising:
    a tailgate including at least two panel-supporting posts adapted for translating between a stowed position and a substantially horizontal deployed position to hold a work surface; and
    a cargo area extender configurable for supporting in a substantially planar configuration by the deployed at least two panel-supporting posts.

2. The work surface apparatus of claim 1, wherein the cargo area extender is defined by a folding panel.

3. The work surface apparatus of claim 2, wherein the folding panel is stowed within a portion of the tailgate.

4. The work surface apparatus of claim 1, wherein the at least two panel-supporting posts are hingedly connected to the tailgate.

5. The work surface apparatus of claim 1, wherein the at least two panel-supporting posts are extendable outwardly from the tailgate when placed in a lowered configuration to provide the substantially horizontal deployed orientation.

6. The work surface apparatus of claim 2, wherein the folding panel comprises a plurality of hingedly connected sections.

7. The work surface apparatus of claim 6, wherein the hinges are lockable to hold the plurality of hingedly connected sections in a folded or an unfolded configuration.

8. The work surface apparatus of claim 2, wherein the folding panel comprises a plurality of pins or tongues for inserting into cooperating apertures or slots defined in the at least two panel-supporting posts.

9. A vehicle including the work surface apparatus of claim 1.

10. A work surface apparatus for a vehicle cargo area, comprising:
    a tailgate including at least two support posts adapted for translating between a stowed position and a substantially horizontal deployed position; and
    a folding cargo area extender configurable to define a substantially planar work surface for holding in a substantially horizontal orientation by the deployed at least two support posts.

11. The work surface apparatus of claim 10, wherein the at least two support posts are hingedly connected to the tailgate or deploy by extending outwardly from the tailgate when placed in a lowered configuration.

12. The work surface apparatus of claim 10, wherein the cargo area extender comprises a plurality of pins or tongues for inserting into cooperating apertures or slots defined in the at least two support posts.

13. The work surface apparatus of claim 10, wherein the folding cargo area extender comprises a plurality of hingedly connected sections secured one to another by lockable 180 degree hinges.

14. A vehicle including the work surface apparatus of claim 10.

15. A vehicle including a cargo area work surface apparatus, comprising:
    a tailgate or liftgate comprising:
    at least two support posts adapted for translating between a stowed position and a substantially horizontal deployed position; and
    a folding cargo area extender held in a recessed stowed position within a portion of the tailgate and adapted to be unfolded into a substantially planar configuration supported by the deployed at least two support posts.

16. The vehicle of claim 15, wherein the at least two support posts are hingedly connected to the tailgate or deploy by extending outwardly from the tailgate when placed in a lowered configuration to provide the substantially horizontal deployed orientation.

17. The vehicle of claim 15, wherein the folding cargo area extender comprises a plurality of hingedly connected sections.

18. The vehicle of claim 17, wherein the hinges are lockable to hold the plurality of hingedly connected sections in a folded or an unfolded configuration.

19. The vehicle of claim 16, wherein the folding cargo area extender comprises a plurality of pins or tongues for inserting into cooperating apertures or grooves defined in the at least two support posts.

* * * * *